(No Model.)

C. A. HITCHCOCK.
GALVANIC BATTERY.

No. 430,075.  Patented June 10, 1890.

Witnesses.
L. D. Hanford
D. A. Davenport

Inventor.
Charles A. Hitchcock
Per J. A. Sturgeon
Atty.

UNITED STATES PATENT OFFICE.

CHARLES A. HITCHCOCK, OF NORTH EAST, ASSIGNOR OF ONE-HALF TO SAMUEL A. DAVENPORT, OF ERIE, PENNSYLVANIA.

GALVANIC BATTERY.

SPECIFICATION forming part of Letters Patent No. 430,075, dated June 10, 1890.

Application filed May 23, 1889. Renewed December 16, 1889. Serial No. 333,979. (No model.)

*To all whom it may concern:*

Be it known that I, CHARLES A. HITCHCOCK, a citizen of the United States, residing at North East, in the county of Erie and State of Pennsylvania, have invented certain new and useful Improvements in Galvanic Batteries; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in galvanic batteries hereinafter set forth and explained, and illustrated in the accompanying drawings, in which—

Figure 1:
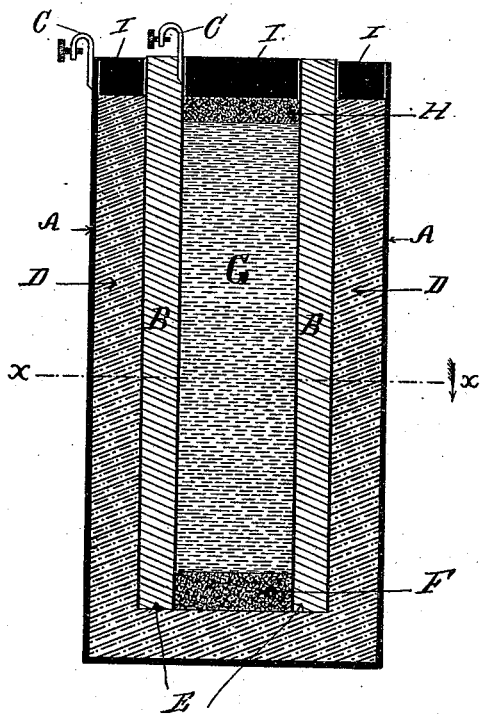
Figure 2:
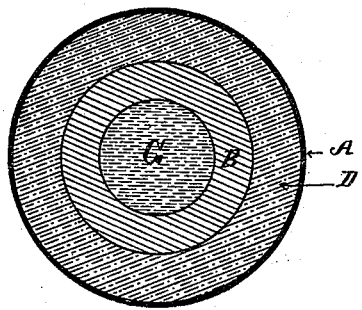

Figure 1 is a vertical central section of my improved battery. Fig. 2 is a cross-section of the same on the line $x\ x$ in Fig. 1.

In the construction of my improved battery shown, A is a zinc cup, and B a hollow carbon cylinder. These are each provided with a suitable binding-screw C for connecting conductors thereto, and operate as the positive and negative electrodes of the battery. The carbon cylinder B, I place inside of the zinc cup A and fill the space between them with an exciting agent D—preferably composed of sal-ammoniac, one part; chloride of zinc, one and one-half part; plaster, three parts; water, two parts—so that a considerable thickness of the exciting agent D is thus interposed between the sides and lower end of the carbon cylinder B and the zinc cup A. This material speedily becomes a semi-solid therein.

The bottom E of the hollow carbon cylinder B, I seal for a short distance, preferably with plaster-of-paris or other suitable material F. The cylinder B may, however, be made with a closed bottom or top in the form of a cup, if desired, in which case the closed end will not require a plaster seal. I then fill the hollow carbon cylinder B with a compound G—consisting, preferably, of chromic acid, one part; plaster, three parts, and water, two parts—to near the top of the cylinder, which speedily becomes a semi-solid therein, over which I preferably place a seal or covering H of plaster-of-paris. I then seal the entire top outside and inside of the hollow carbon cylinder B with a seal I of bitumen or other suitable sealing material, so that it is substantially air and fluid tight.

In the construction of my battery I do not limit myself to the compounding of the exciting agent D (occupying the space between the carbon cylinder B and zinc cup A) out of the exact materials referred to or in the proportions indicated, as it is obvious that other and well-known compounds of materials operating as exciting agents for galvanic batteries can be used therein. Neither do I confine myself to the use of chromic acid alone in the compound G, occupying the central portion of the carbon cylinder B, as I can use sulphuric, nitric, or other acids therein in lieu of the one named, my invention relating rather to the construction of galvanic batteries on the plan described than to the particular materials used in the exciting depolarizing agents thereof.

Therefore, what I claim as new, and desire to secure by Letters Patent of the United States, is—

1. The combination, in a galvanic battery, of a zinc cup and an isolated hollow carbon cylinder therein filled with a depolarizing agent and having its top and bottom closed or sealed, with an exciting agent filling and occupying the space between the outside of the carbon cylinder and the zinc cup in which it is located, substantially as set forth.

2. The combination, in a galvanic battery, of a zinc cup and an isolated hollow carbon cylinder therein filled with a semi-solid depolarizing agent and having its top and bottom sealed or closed, with a semi-solid exciting agent occupying and filling the space between the outside of the carbon cylinder and the zinc cup in which it is located, substantially as and for the purpose set forth.

3. The combination, in a galvanic battery, of a zinc cup and an isolated hollow carbon cylinder therein filled with a semi-solid acid depolarizing agent and having its bottom and top closed or sealed, with a semi-solid alkaline exciting agent filling the space between the outside of the carbon cylinder and the inside of the zinc cup, and a seal closing the top of the zinc cup outside and inside of the carbon cylinder, substantially as set forth.

In testimony whereof I affix my signature in presence of two witnesses.

CHARLES A. HITCHCOCK.

Witnesses:
SAMUEL A. DAVENPORT,
JAMES M. SHERWIN.